(12) United States Patent
Coffinberry et al.

(10) Patent No.: US 8,522,572 B2
(45) Date of Patent: Sep. 3, 2013

(54) ADAPTIVE POWER AND THERMAL MANAGEMENT SYSTEM

(75) Inventors: George Albert Coffinberry, West Chester, OH (US); Neil Richard Garrigan, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 13/117,627

(22) Filed: May 27, 2011

(65) Prior Publication Data

US 2012/0000205 A1    Jan. 5, 2012

Related U.S. Application Data

(60) Provisional application No. 61/398,835, filed on Jul. 1, 2010.

(51) Int. Cl.

| | | |
|---|---|---|
| *F25D 9/00* | (2006.01) | |
| *F25B 19/00* | (2006.01) | |
| *F25B 9/00* | (2006.01) | |
| *B64D 13/04* | (2006.01) | |
| *F02C 7/12* | (2006.01) | |
| *F02C 1/00* | (2006.01) | |
| *F02C 7/08* | (2006.01) | |
| *F02C 6/04* | (2006.01) | |
| *F02K 3/02* | (2006.01) | |
| *F02K 99/00* | (2009.01) | |

(52) U.S. Cl.
USPC ............. 62/402; 62/7; 62/86; 62/87; 62/401; 165/235; 60/39.83; 60/262; 60/266; 60/730; 60/736; 60/785; 60/806

(58) Field of Classification Search
USPC ........ 62/402, 401, 7, 86, 87, DIG. 5; 60/806, 60/39.83, 262, 266, 730, 736, 785; 165/235
See application file for complete search history.

(56) References Cited

U.S. PATENT DOCUMENTS

| | | |
|---|---|---|
| 4,741,152 A | 5/1988 | Burr et al. |
| 4,776,536 A | 10/1988 | Hudson et al. |
| 6,050,080 A * | 4/2000 | Horner ........................... 60/784 |
| 6,182,435 B1 * | 2/2001 | Niggemann et al. ........... 60/772 |
| 6,415,595 B1 | 7/2002 | Wilmot, Jr. et al. |
| 6,948,331 B1 * | 9/2005 | Ho .................................. 62/401 |
| 7,140,174 B2 | 11/2006 | Johnson |
| 7,260,926 B2 | 8/2007 | Sabatino et al. |
| 7,481,214 B2 | 1/2009 | Eilers |
| 7,608,131 B2 | 10/2009 | Jensen |
| 7,624,592 B2 | 12/2009 | Lui et al. |

(Continued)

*Primary Examiner* — Judy Swann
*Assistant Examiner* — Filip Zec
(74) *Attorney, Agent, or Firm* — General Electric Co.; Steven J. Rosen; David J. Clement

(57) ABSTRACT

An aircraft adaptive power thermal management system for cooling one or more aircraft components includes an air cycle system, a vapor cycle system, and a fuel recirculation loop operably disposed therebetween. An air cycle system heat exchanger is between the air cycle system and the fuel recirculation loop, a vapor cycle system heat exchanger is between the vapor cycle system and the fuel recirculation loop, and one or more aircraft fuel tanks are in the fuel recirculation loop. An intercooler including a duct heat exchanger in an aircraft gas turbine engine FLADE duct may be in the air cycle system. The system is operable for providing on-demand cooling for one or more of the aircraft components by increasing heat sink capacity of the fuel tanks.

21 Claims, 4 Drawing Sheets

(56) References Cited

U.S. PATENT DOCUMENTS

| | | | |
|---|---|---|---|
| 2005/0268612 A1* | 12/2005 | Rolt | 60/728 |
| 2008/0110603 A1 | 5/2008 | Fellague et al. | |
| 2009/0249808 A1* | 10/2009 | Ullman et al. | 62/119 |
| 2010/0107603 A1 | 5/2010 | Smith | |
| 2010/0170262 A1 | 7/2010 | Kaslusky et al. | |
| 2010/0313591 A1* | 12/2010 | Lents et al. | 62/259.2 |

* cited by examiner

ADAPTIVE POWER AND THERMAL MANAGEMENT SYSTEM

RELATED APPLICATIONS

This application claims a benefit of a priority filing date to U.S. Provisional Application Ser. No. 61/398,835, filed on Jul. 1, 2010, titled "Adaptive Power and Thermal Management System".

BACKGROUND OF THE INVENTION

1. Technical Field

The present invention relates generally to gas turbine engine powered aircraft power and thermal management systems and, more specifically, to such systems for cooling components of the gas turbine engine and aircraft.

2. Background Information

In recent years, modern military aircraft designs such as for Lockheed F35 have included integrated power and cooling systems also referred to as power and thermal management systems.

U.S. Pat. No. 7,624,592 discloses a power and cooling management system configured to flexibly couple various adaptive modules to an integrated power and cooling unit to suit any aircraft platform is provided. The integrated power and cooling unit has a compressor(s), power turbine(s), cooling turbine(s) and integral starter generator(s) mounted to the shaft of the power and cooling turbine. The integrated power and cooling unit may be pneumatically and/or pneumatically coupled to an adaptive module that comprises an additional compressor and an additional turbine or electrically coupled to a fuel cell which provides the main power after entering the full operation mode. When the engine includes an integral starter generator mounted thereto, the integral starter generator of the integrated power and cooling unit is operative to receive electric power from the engine mounted generator. Alternatively, a motor/generator may be mounted to the shaft of the additional turbine of the adaptive module.

Other examples of integrated power and cooling systems discussed in U.S. Pat. No. 7,624,592 include U.S. Pat. Nos. 4,684,081, 4,494,372, 4,684,081, 4,503,666, 5,442,905, 5,490,645, 6,415,595, and 6,845,630. The inventors of U.S. Pat. No. 7,624,592 found that these designs were complex and wanted to reduce the complexity of the engine configuration and its integrated power and cooling systems.

Future military aircraft will have considerably more electronics (for countermeasures, jamming, direct energy weapons, etc.) than what is used today. The future aircraft will need megawatt (MW) levels of cooling instead of kilowatt (KW) levels of cooling used today. Current thermal management systems do not supply such large amounts of cooling power. There is a need to provide cooling for on-demand heat loads combined with aircraft fuel tank heat sink storage. On-demand cooling means being able to supply short duration high cooling loads and low cooling load during the majority of the aircraft mission time. Bursts of high cooling loads or power are required during high powered flight and directed energy weapon operation.

BRIEF DESCRIPTION OF THE INVENTION

An aircraft adaptive power thermal management system includes a variable cooling power air cycle system, a vapor cycle system, and a fuel recirculation loop operably disposed therebetween. An air cycle system heat exchanger operably disposed between the air cycle system and the fuel recirculation loop transfers heat from the fuel recirculation loop to the air cycle system. A vapor cycle system heat exchanger is operably disposed between the vapor cycle system and the fuel recirculation loop for transferring heat from the vapor cycle system to the fuel recirculation loop. One or more aircraft fuel tanks are in the fuel recirculation loop.

An exemplary embodiment of the system includes an intercooler in the air cycle system and a duct heat exchanger of the intercooler disposed in an aircraft gas turbine engine FLADE duct. An engine burn fuel to air heat exchanger may also be disposed in the intercooler.

The air cycle system may also include an air cycle machine having a power turbine drivingly connected to a machine compressor and a cooling turbine of the air cycle machine, the intercooler operably disposed between the machine compressor and the cooling turbine, the air cycle system heat exchanger operably disposed between the machine compressor and the cooling turbine, the power turbine connected to and in pressurized air receiving relationship with a compressor stage of an aircraft gas turbine engine high pressure compressor, and a combustor operably disposed between the power turbine and the compressor stage. The compressor stage may be a compressor discharge stage.

An air cycle machine engine control may be used for providing on-demand cooling for one or more of the aircraft components by increasing heat sink capacity of the fuel tanks and controlling a flow rate and pressure of the pressurized air into the power turbine and the combustor.

A more particular embodiment of an aircraft adaptive power thermal management system has an air cooling circuit including a machine compressor coupled to a cooling turbine of an air cycle machine, an intercooler disposed between a machine compressor outlet of the machine compressor and a cooling turbine inlet of the cooling turbine, an air cycle system heat exchanger in serial airflow relationship between a cooling turbine outlet of the cooling turbine and a machine compressor inlet of machine compressor. The system further includes a fuel recirculation loop for recirculating cooling fuel in serial fuel flow relationship between one or more aircraft fuel tanks, the air cycle system heat exchanger, and a vapor cycle system condenser. The air cycle system heat exchanger is operably disposed in the fuel recirculation loop between the one or more fuel tanks and the vapor cycle system condenser. A refrigeration loop provides cooling for aircraft components and includes in serial flow relationship the vapor cycle system condenser, a vapor cycle system compressor and a vapor cycle system evaporator.

The system may include an inter fuel tank recirculation loop between the internal fuel tank(s) and one or more wet wing fuel tanks for recirculating fuel between wing and internal fuel tanks.

The compressor stage may be a mid-stage between a first stage and a compressor discharge stage of the high pressure compressor. A cooling air portion of cooling air exiting the cooling turbine may be flowed for cooling and ventilation for at least one of an aircraft cockpit, avionics, onboard inert gas generation systems, and onboard oxygen gas generation systems.

DETAILED DESCRIPTION OF THE INVENTION

Figure 1:
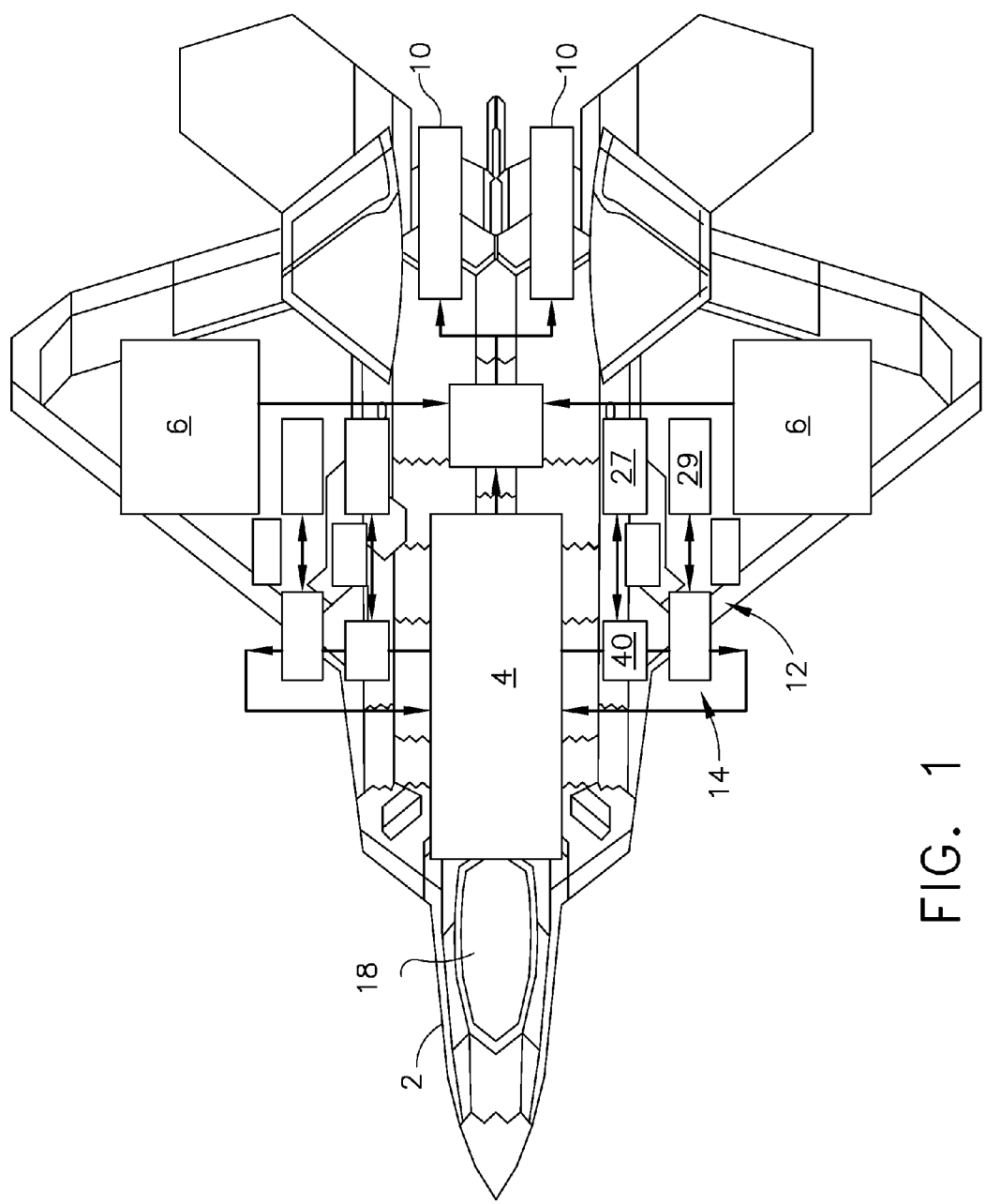
FIG. 1 is a diagrammatical view illustration of a gas turbine engine powered aircraft having an adaptive power thermal management system (APTMS) for using fuel tanks as an on-demand heat sink for cooling aircraft components.

Illustrated diagrammatically in FIG. 1 is an exemplary gas turbine engine powered aircraft 2 having dual turbofan aircraft gas turbine engines 10 and an internal fuel tank(s) 4 and two wet wing fuel tanks 6 for storing aircraft fuel 11. The wing fuel tanks 6 are referred to as being wet because they are housed in the wings and subject to cooling and heating of ambient air through which the aircraft flies. The aircraft includes an adaptive power thermal management system (APTMS) 12 powered by one or both of the gas turbine engines 10.

Figure 2:
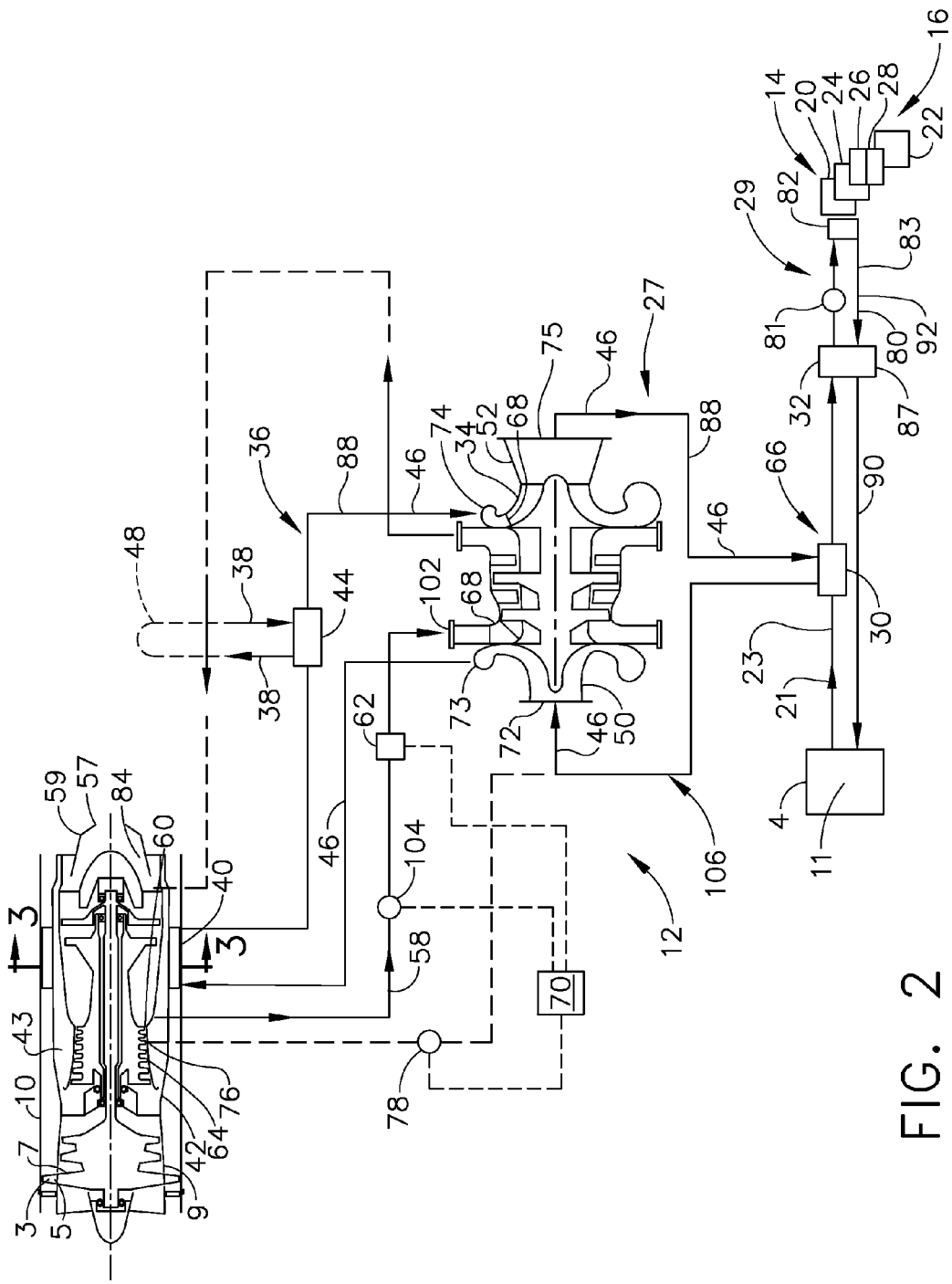
FIG. 2 is a more detailed diagrammatical view illustration of the APTMS illustrated in FIG. 1.

Referring to FIGS. 1 and 2, the adaptive power thermal management system (APTMS) 12 includes an environmental control system (ECS) 14 to provide cooling for liquid and air cooled aircraft components 16 and equipment as well as thermal control and pressurization for the cockpit 18. Exemplary cooled aircraft components 16 include directed energy weapons (DEW) 20, avionics 22, alternating current (A/C) electronics 24, onboard inert gas generation systems (OBIGGS) 26, and onboard oxygen gas generation systems (OBOGS) 28.

Figure 3:
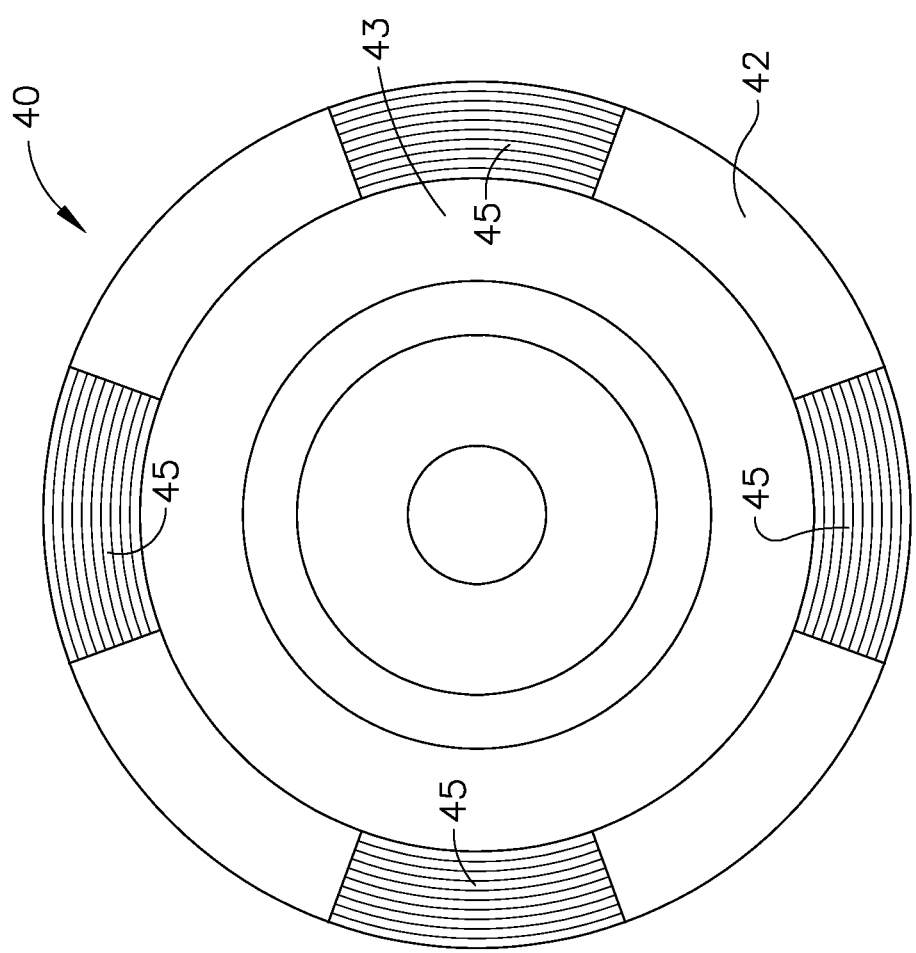
FIG. 3 is diagrammatical view of duct heat exchanger elements distributed around and in a FLADE duct of the engine illustrated in FIG. 2.

The environmental control system (ECS) 14 is cooled by a variable cooling power air cycle system ACS 27 and a vapor cycle system (VCS) 29. The ACS 27 includes a variable speed air cycle machine (ACM) 34 and an intercooler 36 including an air to air duct heat exchanger 40. The exemplary duct heat exchanger 40 is disposed in a FLADE duct 42 of the engine 10 and may include heat exchanger sections 45 distributed around the FLADE duct 42 as illustrated in FIG. 3. The duct heat exchanger 40 could be placed in another type of fan duct such as a fan bypass duct 43 of the engine illustrated in FIG. 2.

The intercooler 36 is used to cool cooling air 46 cooled by the ACM 34. The intercooler 36 further includes an engine burn fuel to air heat exchanger 44 in thermal communication with engine burn fuel 38 used to fuel the aircraft gas turbine engines 10. The engine fuel to air heat exchanger 44, downstream of the intercooler 36, uses a polyalphaolefin (PAO) loop 48 to exchange heat between cooling air 46 from the ACM 34 and the engine burn fuel 38.

The duct heat exchanger 40 and the fuel to air heat exchanger 44 are inline and used to cool cooling air 46 flowing between a machine compressor 50 and a cooling turbine 52 of the ACM 34. The cooling air 46 is directed from the machine compressor 50, through the intercooler 36, into the cooling turbine 52. The cooling air 46 exiting the cooling turbine 52 is then used to cool the internal fuel tank(s) 4. The ACM 34 includes an ACM power turbine 54 for driving the machine compressor 50 and the cooling turbine 52 through a shaft 56. The ACM power turbine 54 is powered by pressurized air 58 from a compressor discharge stage 60 of a high pressure compressor 64 of one of the aircraft gas turbine engines 10.

The pressurized air 58 from the compressor discharge stage 60 is often referred to as CDP air or bleed. CDP is a well known acronym for compressor discharge pressure. The pressurized air 58 from the compressor discharge stage 60 flows into a power turbine inlet 102 of the power turbine 54. Flow rate and pressure of the pressurized air 58 flowed into the power turbine 54 is regulated by a CDP pressure regulator 104 disposed between the compressor discharge stage 60 and the power turbine inlet 102 of the power turbine 54.

The exemplary power turbine 54 illustrated herein has a fixed area power turbine inlet nozzle 68, but it may be a variable area inlet nozzle. The variable area inlet nozzle is more complex, but varies turbine flow and sets turbine speed without the pressure losses associated with a CDP pressure regulator.

When the ACM cooling compressor 50 power requirements exceed power available from the cooling turbine 52 using just the energy in the pressurized air 58, then the pressurized air 58 from the compressor discharge stage 60 is heated in an ACM combustor 62 to increase power produced by the ACM power turbine 54. The ACM combustor 62 is disposed between the CDP pressure regulator 104 and the power turbine inlet 102 to the power turbine 54. In an exemplary embodiment of the adaptive power thermal management system (APTMS) 12, the relatively small ACM combustor 62 heats up the pressurized air 58 to about 1450 degrees Fahrenheit. The pressurized air 58 exhausted from the ACM power turbine 54 is dumped into engine exhaust 84 upstream of a throat 57 of a gas turbine exhaust nozzle 59 of the engine 10 to recover thrust from the power turbine air flow.

The exemplary ACM 34 illustrated herein includes a centrifugal machine compressor 50 including a compressor inlet 72 and a compressor outlet 73, a radial inflow cooling turbine 52 including a cooling turbine inlet 74 and a cooling turbine outlet 75, and a radial inflow or axial ACM power turbine 54. The exemplary cooling turbine 52 illustrated herein has a fixed area cooling turbine inlet nozzle 68, but it may be a variable area nozzle to maintain the machine compressor on its operating line for stall margin.

Cooling fuel 21 from the internal fuel tank(s) 4 flows through a pipe 23 of a fuel recirculation loop 66 to an air cycle system heat exchanger 30 and then to a vapor cycle system (VCS) condenser 32 in the VCS 29 where it is used to cool a working fluid 80 in the VCS 29. The working fluid 80 may be a well known refrigerant such as R-134a. The VCS 29 further includes a VCS compressor 81 and a VCS evaporator 82. The working fluid 80 is recirculated in a refrigeration loop 83 from the VCS condenser 32 to the VCS compressor 81 to VCS evaporator 82 which cools aircraft components 16 (including a direct energy weapon, hydraulics, and air systems) and then back to the VCS condenser 32. Note that the condenser is also a VCS heat exchanger 87.

The cooling air 46 exhausted from the cooling turbine 52 of the ACM 34 is directed to the air cycle system heat exchanger 30 where it is used to cool the cooling fuel 21 in the fuel recirculation loop 66. The cooling air 46 is flowed from the air cycle system heat exchanger 30 to an ACS compressor inlet 72 to the machine compressor 50. The ACS compressor inlet 72 to the machine compressor 50 is referenced to engine mid-stage bleed 76 by a mid-stage pressure regulator 78. The mid-stage pressure regulator 78 is used to fill an ACM cooling air loop 106 and to maintain a variable pressure at the ACS compressor inlet 72 to the machine compressor 50. The ACM cooling air loop 106 includes the machine compressor 50, the cooling turbine 52, the intercooler 36 including the flade air duct heat exchanger 40 and the engine fuel to air heat exchanger 44, and the air cycle system heat exchanger 30.

The cooling fuel 21 returns to the internal fuel tank(s) 4 from the VCS condenser 32, thus cooling the fuel in the internal fuel tank(s) 4 which can operate as an on-demand heat sink. Flow rate through the pipe 23 is designed to be very high for example 200 gpm in order not to have a large temperature gradient in the ACS or the VCS. However, pump power for this fuel recirculation in only on the order of about 18 HP. Thus, the adaptive power thermal management system APTMS 12 is used to cool fuel in the internal fuel tank(s) 4 for use as on-demand cooling, for example, for the DEW 20, when needed.

Heat transfer between the ACM 34 and engine burn fuel is via a PAO loop 48 used to exchange heat between cooling air 46 from the ACM 34 and the engine burn fuel 38. In the ACS 27 illustrated herein, heat transfer for ACS intercooling is treated separately from the other aircraft systems which transmit heat to engine burn fuel. After cooling by the ACS, the cold recirculation loop fuel flows to the VCS condenser. The VSC uses R-134a refrigerant and provided a constant 59 degrees Fahrenheit fluid temperature for all aircraft electronics. A PAO loop can be used as an option to the VCS.

The adaptive power thermal management system (APTMS) 12 may be described as including an air cooling circuit 88, a fuel cooling circuit 90, and a refrigerant cooling circuit 92. The air cooling circuit 88 includes the machine compressor 50 and the cooling turbine 52 and the intercooler 36. The intercooler 36 is disposed between the machine compressor outlet 73 and the cooling turbine inlet 74. The air cooling circuit 88 further includes the air cycle system heat exchanger 30 in serial airflow relationship between the cooling turbine outlet 75 and the machine compressor inlet 72. The fuel cooling circuit 90 is the fuel recirculation loop 66 which also includes the air cycle system heat exchanger 30 and is used to cool the cooling fuel 21 in the fuel recirculation loop 66. The air cycle system heat exchanger 30 is an air to fuel heat exchanger between the air and fuel cooling circuits 88, 90.

The largest influence on ACS cooling capability is the pressure ratio and air flow rate of the cooling air 46 through the machine compressor 50. A high pressure ratio also provides high cooling rate across the cooling turbine 52. High flow rate also increases cooling rate in both fan air duct heat exchanger 40 and the engine fuel to air heat exchanger 44 of the intercooler 36 and the air cycle system heat exchanger 30 of the fuel recirculation loop 66 for cooling the vapor cycle system (VCS) condenser 32 in the VCS 29. High compressor pressure ratio and flow rate typically would require more power from the high pressure compressor 64 of one of the aircraft gas turbine engines 10 such as from the compressor discharge stage 60. This would have a negative impact on engine SFC from high CDP bleed.

The adaptive power thermal management system, the APTMS 12 disclosed herein, overcomes this problem by using an on-demand dual mode of ACS cooling. When high cooling rates are not needed, the ACM produces low pressure ratio and corresponding low flow rate of the cooling air 46. The APTMS power mode is defined by the pressure ratio of the ACM machine compressor 50. For a given desired pressure ratio, the cooling turbine inlet nozzle 68 sets physical flow since the nozzle is choked. This is as a function of the nozzle flow factor, turbine pressure ratio, and turbine corrected speed. Compressor corrected speed is varied to maintain the compressor on an operating line chosen for best efficiency and adequate stall margin.

An exemplary high power corrected speed corresponds to a pressure ratio of 6.0 and a corresponding exemplary low power corrected speed corresponds to a pressure ratio of 3.0. These values remain essentially constant for any aircraft flight point or engine power setting. With sensed values of shaft physical speed, compressor inlet temperature and compressor inlet pressure of the ACM 34, it is well known to use an electronic ACM engine control 70 to electronically control corrected speed by adjusting pressure into the ACM power turbine 54 with a throttling valve such as the mid-stage pressure regulator 78. An exemplary pressure of the pressurized air 58 from the compressor discharge stage 60 flowing into the ACM machine compressor 50 is about 100 psig.

On-demand cooling is provided when the ACM engine control 70 receives such an instruction from an aircraft flight control. The ACM engine control 70 also controls the CDP pressure regulator 104 to control flow rate and pressure of the pressurized air 58 flowed into the power turbine 54. The ACM engine control 70 may also be used to control the ACM combustor 62. The ACM engine control 70 can increase the heat sink capacity of the internal fuel tank(s) 4 to provide the on-demand cooling by increasing the flow rate and pressure of the pressurized air 58 flowed into the power turbine 54.

The FLADE duct 42 is a good location for the duct heat exchanger 40 because there is typically fewer FLADE stages than fan stages and so the FLADE duct airflow is cooler. A FLADE engine (FLADE being an acronym for fan on blade) is characterized by an outer fan 3 having FLADE fan blades 5 radially extending across the FLADE duct 42 and connected to and thus driven by a radially inner fan 7. The outer fan 3 discharges its flade air into the FLADE duct 42 which is generally co-annular with and circumscribes a radially inner fan duct 9 circumscribing the inner fan 7. One such engine disclosed in U.S. Pat. No. 4,043,121, entitled "Two Spool Variable Cycle Engine", by Thomas et al., provides a flade fan and outer fan duct within which variable guide vanes control the cycle variability by controlling the amount of air passing through the flade outer fan duct. A FLADE engine is capable of maintaining an essentially constant inlet airflow over a relatively wide range of thrust at a given set of subsonic flight ambient conditions such as altitude and flight Mach No. in order to avoid spillage drag and to do so over a range of flight conditions have been studied. This capability is particularly needed for subsonic part power engine operating conditions. One such engine is disclosed in U.S. Pat. No. 5,404,713, entitled "Spillage Drag and Infrared Reducing Flade Engine".

Figure 4:
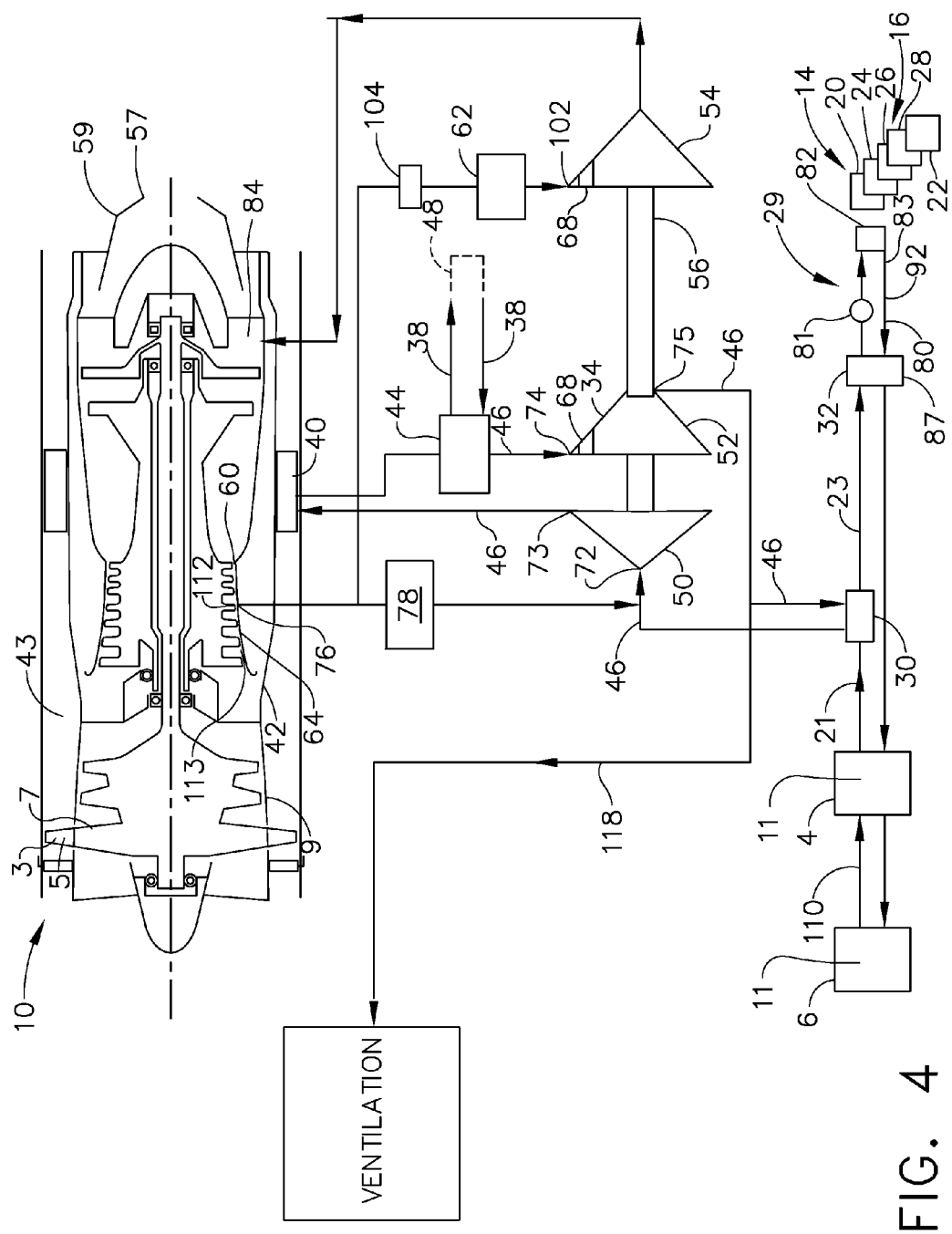
FIG. 4 is a diagrammatical view illustration of an alternative adaptive power thermal management system (APTMS) that uses compressor discharge air for in an air cycle machine (ACM) of the APTMS.

Additional cooling for the internal fuel tank(s) 4 may be provided by the two wet wing fuel tanks 6 when they are sufficiently cooler than the internal fuel tank(s) 4 as illustrated in FIG. 4. The wing fuel tanks 6 are subject to cooling as the aircraft flies through the ambient air during subsonic operation. An inter fuel tank recirculation loop 110 may be used for recirculating fuel between wing and internal fuel tanks. The inter fuel tank recirculation loop 110 may be shut off during supersonic flight and provides additional heat sink capacity to the internal tank(s) 4 for cooling fuel in the fuel recirculation loop 66. The additional heat sink capacity makes additional cooling capacity available to the vapor cycle system 29 for cooling the aircraft components 16. The electronic ACM engine control 70 may be used to control flowrate of fuel in the inter fuel tank recirculation loop 110 as well as turn it on or shut it off.

FIG. 4 also illustrates the pressurized air 58 being bled from a mid-stage 112 of the high pressure compressor 64 for powering the ACM power turbine 54. The mid-stage 112 is about is about ½ between a first stage 113 and the compressor discharge stage 60 of the high pressure compressor 64. A cooling air portion 118 of the cooling air 46 exiting the cooling turbine 52 may be used for cooling and ventilation for at least one of the cockpit 18, avionics 22, onboard inert gas generation systems (OBIGGS) 26, and onboard oxygen gas generation systems (OBOGS) 28.

The adaptive power thermal management system (APTMS) 12 provides a steady-state transfer of demand heat load to conventional heat sinks (such as ram air, fan air, flade air and/or engine burn fuel) and to aircraft fuel tank heat sink or fuel stored in the aircraft fuel tanks. In order to achieve the high levels of cooling required at critical mission points such as DEW firing, the APTMS must operate at high cooling power during opportunistic mission segments. During the opportunistic mission segments, the APTMS 12 heat sink or cooling capacity is built up or stored in the fuel tanks for later use during the critical mission points or segments.

Two exemplary opportunistic mission segments for build up of fuel tank heat sink or cooling capacity are ground idle prior to takeoff (typically lasting 20 minutes) and during initial climb to cruise altitude (typically lasting 3 to 5 minutes). During these opportunistic mission segments, the APTMS will be operated at maximum cooling power. Depending on the temperature of ram air, fan air or flade air heat sinks, the APTMS may or may not be operated at maximum cooling power during critical mission points such as DEW firing. At other mission points, the APTMS will be operated at low cooling power since there is no need for critical cooling or tank cooling, thus saving fuel.

The ACM power turbine 54 is powered by the pressurized air 58 or bleed air from the compressor discharge stage 60 of the high pressure compressor 64 of the aircraft gas turbine engines 10. The fuel savings results from the APTMS 12 not having to be operated at maximum cooling power throughout the mission, the SFC penalty for using the compressor bleed air full time is highly undesirable. In addition to this excessive SFC, there is also a concern with excessive engine core bleed, which can cause high fuel-air ratio and high engine turbine inlet temperature. An exemplary desirable limit on engine core bleed is typically 10 percent of core inlet flow.

Therefore, an important aspect of the present invention is APTMS cooling power and the means for controlling APTMS cooling power. The electronic ACM engine control 70 is operable to receive an APTMS cooling power set point signal from an aircraft flight control. For example, ACM cooling power demand might be 95 percent during ground idle to achieve maximum fuel tank cooling rate without exceeding 10 percent of core bleed.

Cooling power is expressed in terms of percent ACM corrected shaft speed (% RPM) which is (RPM/square root (theta)). Where theta=compressor inlet temperature/518.7R and RPM is measured shaft speed of the shaft 56. The compressor inlet temperature is that of the machine compressor inlet 72 of machine compressor 50 and the shaft is the shaft 56 of the ACM 34. The electronic ACM engine control 70 assigns a value of compressor operating line corrected flow and compressor pressure ratio to each value of percent corrected speed and stores it in its EC memory. The electronic ACM engine control 70 receives signals representing sensed values of ACM shaft 56 physical speed, compressor inlet temperature, and compressor inlet pressure.

Compressor physical flow is determined by the ACM cooling turbine inlet nozzle 68 of the exemplary cooling turbine 52. The electronic ACM engine control 70 receives a sensed value of cooling turbine inlet temperature and inlet pressure of the ACM cooling turbine inlet nozzle 68. These values along with shaft speed and fixed turbine nozzle discharge area enables the electronic ACM engine control 70 to calculate turbine nozzle physical flow, which in the closed loop illustrated herein, is the same as compressor inlet physical flow of the machine compressor inlet 72 of the machine compressor 50.

The electronic ACM engine control 70 calculates compressor actual corrected flow (W×square root(theta)/delta) from the physical flow, compressor inlet pressure and compressor inlet temperature of the machine compressor 50. W equals physical flow (pps) which, in the closed loop illustrated herein and described above, is the same as compressor inlet physical flow of the machine compressor inlet 72 of the machine compressor 50. The actual corrected flow is compared with an operating line corrected flow to assure maximum efficiency and stall margin. If actual corrected flow moves to the left of the operating line (towards stall), the ACM inlet pressure, which is pressure at the machine compressor inlet 72 of the machine compressor 50, is reduced to cause an increase in corrected flow and a return to the operating line.

The speed of the ACM 34 is controlled by the power turbine 54 and power turbine inlet temperature is fixed by the ACM combustor 62 upstream of the power turbine. An exemplary fixed power turbine inlet temperature is about 1450 F. Power turbine flow is adjusted by opening and closing the control valve upstream of the turbine which is illustrated herein as the CDP pressure regulator 104 disposed between the compressor discharge stage 60 and the power turbine inlet 102 of the power turbine 54. The resulting power balance between the machine compressor 50, the cooling turbine 52, and the power turbine 54 establishes the ACM physical speed.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. An aircraft adaptive power thermal management system comprising:
 a variable cooling power air cycle system, a vapor cycle system, and a fuel recirculation loop operably disposed therebetween,
 an air cycle system heat exchanger operably disposed between the air cycle system and the fuel recirculation loop for transferring heat from the fuel recirculation loop to the air cycle system, an intercooler in the air cycle system and the intercooler including a duct heat exchanger disposed in an air duct,
 the air cycle system heat exchanger operably disposed in a cooling air loop of the air cycle system used only for cooling fuel in the fuel recirculation loop,
 a vapor cycle system heat exchanger operably disposed between the vapor cycle system and the fuel recirculation loop for transferring heat from the vapor cycle system to the fuel recirculation loop, the air cycle system further including a variable speed air cycle machine having a power turbine drivingly connected to a machine compressor and a cooling turbine of the air cycle machine, the intercooler operably disposed between the machine compressor and the cooling turbine, the air cycle system heat exchanger operably disposed between the machine compressor and the cooling turbine, the power turbine connected to and in pressurized air receiving relationship with a compressor stage of an aircraft gas turbine engine high pressure compressor, and
 one or more aircraft fuel tanks in the fuel recirculation loop.

2. The system as claimed in claim 1 further comprising the air duct being an aircraft gas turbine engine FLADE duct.

3. The system as claimed in claim 2 further comprising an engine burn fuel to air heat exchanger disposed in the intercooler.

4. The system as claimed in claim 2 further comprising:
a combustor operably disposed between the power turbine and the compressor stage.

5. The system as claimed in claim 1 wherein the compressor stage is a compressor discharge stage.

6. The system as claimed in claim 5 further comprising an engine burn fuel to air heat exchanger in the intercooler disposed between the duct heat exchanger and a cooling turbine inlet of the cooling turbine.

7. The system as claimed in claim 6 further comprising an air cycle machine engine control operable for providing on-demand cooling for one or more of the aircraft components by increasing heat sink capacity of the fuel tanks.

8. The system as claimed in claim 7 further comprising the air cycle machine engine control being operable for controlling a flow rate and pressure of the pressurized air into the power turbine and the combustor.

9. An aircraft adaptive power thermal management system comprising:
an air cooling circuit including a machine compressor coupled to a cooling turbine of an air cycle machine,
the air cooling circuit further including an intercooler disposed between a machine compressor outlet of the machine compressor and a cooling turbine inlet of the cooling turbine,
the air cooling circuit further including an air cycle system heat exchanger in serial airflow relationship between a cooling turbine outlet of the cooling turbine and a machine compressor inlet of machine compressor,
a fuel recirculation loop for recirculating cooling fuel in serial fuel flow relationship between one or more aircraft fuel tanks, the air cycle system heat exchanger, and a vapor cycle system condenser,
the air cycle system heat exchanger operably disposed in a cooling air loop of the air cycle system used only for cooling fuel in the fuel recirculation loop,
the air cycle system heat exchanger operably disposed in the fuel recirculation loop between the one or more fuel tanks and the vapor cycle system condenser,
a refrigeration loop for providing cooling for aircraft components, and
the refrigeration loop including in serial flow relationship the vapor cycle system condenser, a vapor cycle system compressor and a vapor cycle system evaporator.

10. The system as claimed in claim 9 further comprising the intercooler including a duct heat exchanger disposed in an aircraft gas turbine engine FLADE duct.

11. The system as claimed in claim 9 further comprising an engine burn fuel to air heat exchanger in the intercooler disposed between the duct heat exchanger and the cooling turbine inlet of the cooling turbine.

12. The system as claimed in claim 11 further comprising:
a power turbine drivingly connected to the machine compressor and the cooling turbine,
the power turbine connected to and in pressurized air receiving relationship with a compressor stage of an aircraft gas turbine engine high pressure compressor, and
a combustor operably disposed between the power turbine and the compressor stage.

13. The system as claimed in claim 12 wherein the compressor stage is a compressor discharge stage.

14. The system as claimed in claim 12 further comprising an engine burn fuel to air heat exchanger in the intercooler disposed between the duct heat exchanger and the cooling turbine inlet of the cooling turbine.

15. The system as claimed in claim 13 further comprising an air cycle machine engine control operable for providing on-demand cooling for one or more of the aircraft components by increasing heat sink capacity of the fuel tanks.

16. The system as claimed in claim 15 further comprising the air cycle machine engine control being operable for controlling a flow rate and pressure of the pressurized air into the power turbine and the combustor.

17. The system as claimed in claim 13 further comprising an inter fuel tank recirculation loop between the internal fuel tank(s) and one or more wet wing fuel tanks for recirculating fuel between wing and internal fuel tanks.

18. The system as claimed in claim 12 wherein the compressor stage is a mid-stage between a first stage and a compressor discharge stage of the high pressure compressor.

19. The system as claimed in claim 18 further comprising an engine burn fuel to air heat exchanger in the intercooler disposed between the duct heat exchanger and the cooling turbine inlet of the cooling turbine.

20. The system as claimed in claim 19 further comprising an air cycle machine engine control operable for providing on-demand cooling for one or more of the aircraft components by increasing heat sink capacity of the fuel tanks and the air cycle machine engine control being operable for controlling a flow rate and pressure of the pressurized air into the power turbine and the combustor.

21. The system as claimed in claim 20 further comprising an inter fuel tank recirculation loop between the internal fuel tank(s) and one or more wet wing fuel tanks for recirculating fuel between wing and internal fuel tanks.

* * * * *

UNITED STATES PATENT AND TRADEMARK OFFICE
CERTIFICATE OF CORRECTION

PATENT NO. : 8,522,572 B2  
APPLICATION NO. : 13/117627  
DATED : September 3, 2013  
INVENTOR(S) : Coffinberry et al.

It is certified that error appears in the above-identified patent and that said Letters Patent is hereby corrected as shown below:

In the Specification

In Column 5, Line 15, delete "VSC" and insert -- VCS --, therefor.

Signed and Sealed this
Fourth Day of March, 2014

Michelle K. Lee
*Deputy Director of the United States Patent and Trademark Office*